United States Patent [19]
Goto et al.

[11] Patent Number: 5,771,133
[45] Date of Patent: Jun. 23, 1998

[54] FLOATING MAGNETIC HEAD

[75] Inventors: Ryo Goto, Mouka; Masahiro Ao, Kaminokawamachi; Fumio Nitanda, Fukaya, all of Japan

[73] Assignee: Hitachi Metals, Ltd., Tokyo, Japan

[21] Appl. No.: 652,021

[22] Filed: May 21, 1996

[30] Foreign Application Priority Data

May 23, 1995 [JP] Japan .................................... 7-148105

[51] Int. Cl.⁶ .............................. G11B 5/60; G11B 21/21
[52] U.S. Cl. ............................................................. 360/103
[58] Field of Search ............................................. 360/103

[56] References Cited

U.S. PATENT DOCUMENTS 5,627,700  5/1997  Kondo et al. ........................ 360/103

FOREIGN PATENT DOCUMENTS

1-116959  5/1989  Japan ..................................... 360/103
5-182137  7/1993  Japan ..................................... 360/103
6-76517   3/1994  Japan ..................................... 360/103

*Primary Examiner*—Robert S. Tupper
*Attorney, Agent, or Firm*—Staas & Halsey

[57] ABSTRACT

Two floating rails are provided on a slider of a floating magnetic head. Rear portions, in the advancing direction of a floating magnetic head with respect to a magnetic recording medium, of the respective floating rails are cut out. That is, the floating rails exist only in front of the cut-out portions. An auxiliary rail is formed in the rear of one of the floating rails. The auxiliary rail is narrower than the floating rail, wider than the track width of an electromagnetic conversion element, and approximately as high as the floating rail. The electromagnetic conversion element is provided at a rear portion of the auxiliary rail.

10 Claims, 7 Drawing Sheets

FLOATING MAGNETIC HEAD

BACKGROUND OF THE INVENTION

1. Field of the Invention

The present invention relates to a floating magnetic head that is mainly used in a hard disk drive of a computer. In particular, the invention is intended to enable recording/reproducing action while causing an electromagnetic conversion element portion of the magnetic head to float above a magnetic recording medium with a very small spacing in between.

2. Description of the Related Art

With recent increase in software size and CPU processing speed, magnetic heads are now required to be more compact and capable of accommodating increase in recording density.

A floating magnetic head is known as being capable of satisfying those requirements. In the floating magnetic head, an electromagnetic conversion element is mounted on a slider. While floating rails of the slider move relative to a magnetic recording medium, they receive air resistance, so that the slider is caused to float above the magnetic recording medium with a very small spacing in between. In this state, recording/reproducing action is effected between the electromagnetic conversion element and the magnetic recording medium.

For the floating magnetic head to be able to satisfy the requirement of increase in recording density, it is necessary to cause the slider of the magnetic head to float above the magnetic recording medium with a very small spacing in between, and to reduce a variation in the flying height of the slider with respect to a variation in the relative speed of the magnetic recording medium because the relative speed increases as the position of the slider goes outward in the radial direction of the rotating medium To these ends, it is conventionally attempted to change the shape and the area of the floating rail surfaces, and to adjust the strength of pressing force of a spring of a holding member for fixing the magnetic head.

Conventionally, as described above, there are proposals for making the flying height of the floating magnetic head from the magnetic recording medium very small, and, for reducing a variation in flying height with respect to a variation in the relative speed between the magnetic head and the magnetic recording medium. However, these proposals do not satisfy those requirements sufficiently. For example, even if the flying height of the slider is made very small, the slider is brought into contact with the magnetic recording medium when the flying height is not stable, to damage the magnetic head or the magnetic recording medium.

As is conventionally proposed, the width of the floating rails may be reduced to decrease the slider flying height. However, the floating rails cannot be made narrower than a certain limit because a magnetic core needs to be buried in one of the floating rails. Further, the slider flying height may be reduced by strengthening the force of a spring for urging the slider toward the magnetic recording medium. However, this makes the impact of the slider on the magnetic recording medium too strong when the magnetic recording medium repeats its rotation and stop. Therefore, as the magnetic recording medium continues to be used, the friction between the slider and the magnetic recording medium increases, so that what is called a crash occurs in the worst case, to damage the magnetic recording medium.

Further, while the magnetic recording medium rotates, the speed and direction of the relative movement between the slider and the magnetic recording medium vary in the radial direction. This causes a variation of the slider flying height, that is, prevents satisfaction of the condition of a constant flying height, which is necessary for improvement in the performances of the magnetic head.

What is called a negative pressure type slider is known as a slider capable of reducing its circumferential speed dependence. This type of slider has a cavity in which air flowing into the slider rapidly expands, and negative pressure generated in the cavity compensates for the positive pressure generated by the conventional floating rails to reduce the circumferential speed dependence. However, this type of slider has a problem of low reliability, because pollutants or debris on the magnetic recording medium are absorbed by the cavity and then likely stick to the slider.

As countermeasures against influences of a variation in the direction of the relative movement between the magnetic recording medium and the slider, that is, a variation of the flying height due to oblique incidence of an air flow on the floating rails, there have been proposed techniques of chamfering the side faces of the floating rails or forming minute steps of about 1 $\mu$m, to thereby facilitate capture of an obliquely incident air flow. However, requiring precise fabrication with an expensive instrument such as an ion milling apparatus, these techniques are not economical.

Further, a reduced flying height of the slider increases a possibility that a floating slider collides with asperities on the surface of the magnetic recording medium. Even in this situation, there are required stable floating and reduction of damage of the magnetic recording medium. To these ends, it may be conceivable to reduce the area of a portion of the slider whose portion may contact with the magnetic recording medium. Although this measure is available in thin-film magnetic heads, it is not practical in composite magnetic heads in which a magnetic core is buried in a slider because complex fabrication as well as a number of working steps is needed.

SUMMARY OF THE INVENTION

An object of the present invention is to solve the above problems, to thereby realize a very small flying height of an electromagnetic conversion element portion of a floating magnetic head when it floats above a magnetic recording medium, and to make the flying height stable with respect to a variation in the relative speed between the magnetic head and the magnetic recording medium.

According to the invention, the above object is attained in a floating magnetic head in which an electromagnetic conversion element is provided on a slider that is made of a non-magnetic material and a writing or reading operation is effected in a state that a magnetic gap of the electromagnetic conversion element is opposed to a magnetic recording medium. In the floating magnetic head, floating rails are provided on a magnetic recording medium facing surface of the slider and has a wide portion and a narrow portion, and the narrow portion is provided on one of the floating rails where the electromagnetic conversion element exists.

Figure 6A:
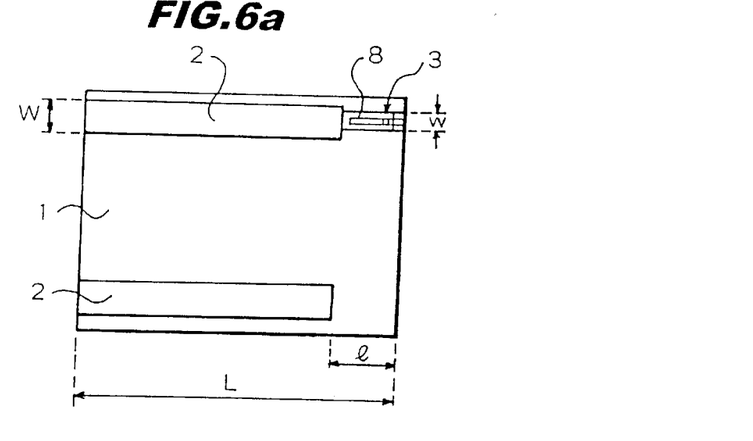
FIG. 6a shows relationships relating to a cut-out length of floating rails of the floating magnetic head and the width of the floating rails.
Figure 6B:
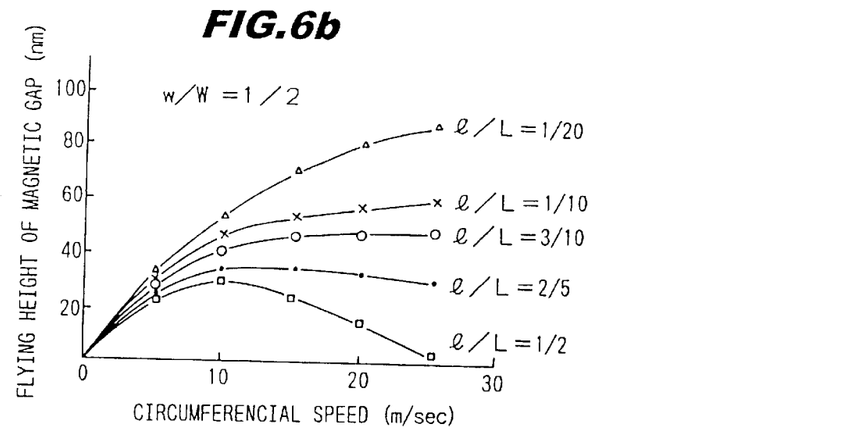
FIG. 6b is a graph showing a relationship between the circumferential speed and the flying height with the cut-out length of the floating rails as a parameter.

In this configuration, to stabilize the flying height of the slider at a very small value, it is desired that the width of an auxiliary rail be not more than $\frac{1}{5}$ of that of the floating rail, or that the width of the auxiliary rail be $\frac{2}{5}$ to $\frac{4}{5}$ of that of the floating rail, and a cut-out portion of the floating rail be $\frac{1}{10}$ to $\frac{2}{5}$ of the overall length of the slider. The width of the auxiliary rail is set wider than a track width of a magnetic core to allow the magnetic core to be buried in the auxiliary rail within its width. Further, it is desired that the width of the auxiliary rail be not more than 4/5 of that of the floating rail.

Where a ratio l/L of the cut-out length l of the floating rail to the slider length L is varied as shown in FIG. 6a, the flying height of the slider varies as shown in FIG. 6b. The flying height is approximately constant when the cut-out length is in a range of 1/10 to 2/5 of the overall length of the slider. A ratio w/W of the auxiliary rail width w to the floating rail width W of sliders used for the measurements of FIG. 6b was ½.

Figure 6C:
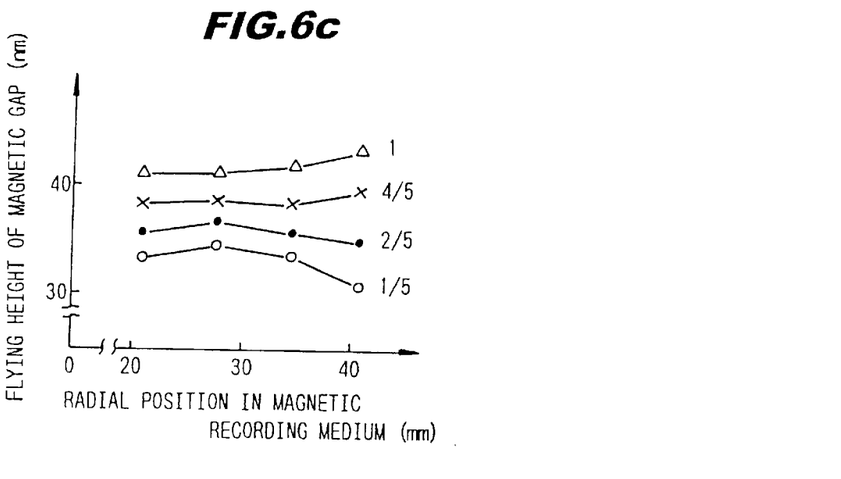
FIG. 6c is a graph showing a relationship between the flying height of the magnetic head and the radial position on the magnetic recording medium with the auxiliary rail width as a parameter.

FIG. 6c shows how the flying height of sliders varies when they are located at several radial positions on a magnetic recording medium (radius: R) with the ratio w/W as a parameter. When the ratio w/W is in a range of 2/5 to 4/5, the flying height is approximately constant with respect to the radial position. The rotation speed of a magnetic recording medium used for the measurements of FIG. 6c was set at 5,400 rpm, and the above-mentioned ratio l/L was 1/5.

To obtain the above structure in which the rear portion of the floating rail is shaped into the auxiliary rail, part of a rear portion, in the advancing direction with respect to the magnetic recording medium, of the floating rail may be removed by grinding to a trailing edge angle inclined surface except for a portion adjacent to the electromagnetic conversion element, to form the auxiliary rail. In this case, a rear portion of the floating rail where the electromagnetic conversion element is not provided may be shaped into a second auxiliary rail that is narrower than and approximately as high as the floating rail. It is desired that an inclined surface 11 on the side of the auxiliary rail have an inclination angle of 5° to 20°. The rear portion of the floating rail where the electromagnetic conversion element is not provided may be removed by grinding over the entire floating rail width, or it may be shaped into an auxiliary rail having a trailing edge angle inclined surface or an auxiliary rail having a stepped surface that is parallel with the magnetic recording medium facing surface.

By making the height of the floating rails on the slider 50 μm or more, the friction between the magnetic head and the magnetic recording medium in a stationary state can be reduced, whereby the CSS characteristic can be improved. Excessively high floating rails are not suitable for a size reduction purpose: the height should be 100 μm at the maximum.

A method for producing the above floating magnetic head comprises the steps of forming two approximately straight floating rails on the magnetic recording medium facing surface of the slider along the advancing direction with respect to the magnetic recording medium over the entire length of the slider; and removing a rear portion of one of the two floating rails by mechanical working with a means such as a grinder while shaping a rear portion of the other floating rail into a narrow auxiliary rail by mechanical working with a means such as grinder. It is desired that the auxiliary rail have a width in a range from a track width of the electromagnetic conversion element to 4/5 of the width of the floating rail.

In the above floating magnetic head, lift is given to the two approximately parallel floating rails that extend in the longitudinal direction from the front end of the slider to a certain position on the slider. The electromagnetic conversion element is provided at a rear end position of the slider, buried in the auxiliary rail. Even the auxiliary rail receives air pressure, it does not contribute to floating of the slider because the auxiliary rail is sufficiently narrower than the floating rail. Thus, a small flying height is attained. Further, since the rear portions of the floating rails are removed, the floating rails need to be so formed as to be relatively wide. Therefore, there is expected an advantage that a variation in flying height due to an air flow obliquely incident on the floating rails can be made very small.

Since the slider has a pitch angle, the electromagnetic conversion element located at the end position of the slider has a smaller height than the flying height that is determined by the air pressure being exerted on the floating rails. Model-based calculations and actual trial measurements of the effective flying attitude showed that the flying height at the position of the floating rails varies with respect to a variation in the circumferential speed with respect to the magnetic recording medium in the same manner as in the conventional sliders. On the other hand, the pitch angle also varies with the circumferential speed. The two kinds of variations cancel out each other, so that the flying height variation with respect to the circumferential speed variation, that is, the circumferential speed dependence of the flying height, becomes small at the position of the electromagnetic conversion element. The portion that possibly contacts with asperities of the magnetic recording medium is the electromagnetic conversion element portion located at the end of the slider. Since this portion is so formed as to be narrow, the possibility that it hurts the magnetic recording medium is low.

Further, as for the production of the above floating magnetic head, since the rear portions of the floating rails are mechanically removed by using a grinder, for instance, the working can be performed easily.

BRIEF DESCRIPTION OF THE DRAWINGS

FIG. 4a includes a partial perspective view.

FIG. 4d is a partial perspective view, FIG. 4e a plan view.

FIG. 5c is a partial perspective view, FIG. 5d is a plan view.

FIG. 5f is a partial perspective view, a plan view.

FIG. 5i is a partial perspective view, FIG. 5j is a plan view.

DESCRIPTION OF THE PREFERRED EMBODIMENTS

Figure 1:
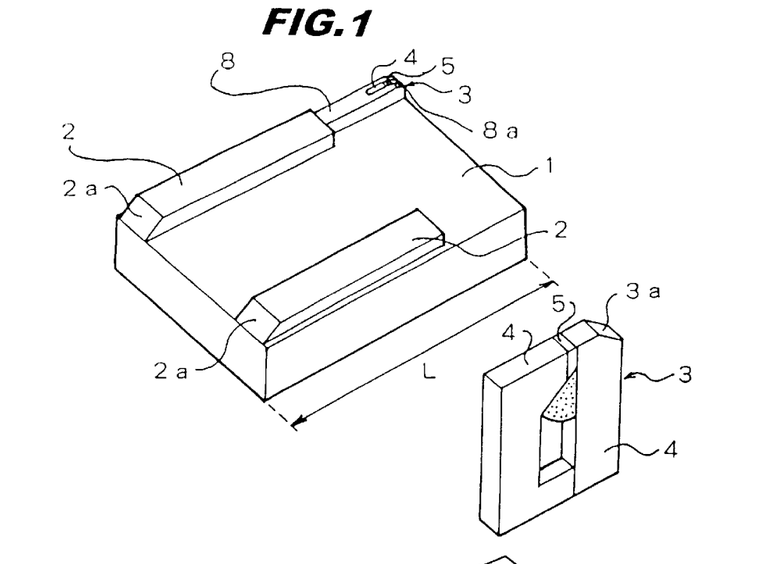
FIG. 1 includes a perspective view of a floating magnetic head according to the present invention as viewed from the side of a magnetic recording medium facing surface, and an enlarged view of a magnetic core.
Figure 2:
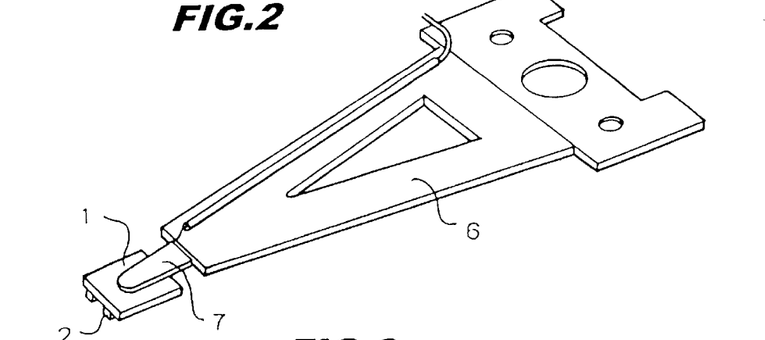
FIG. 2 is a perspective view of a state that the floating magnetic head of the invention is attached to a holding member.
Figure 3:
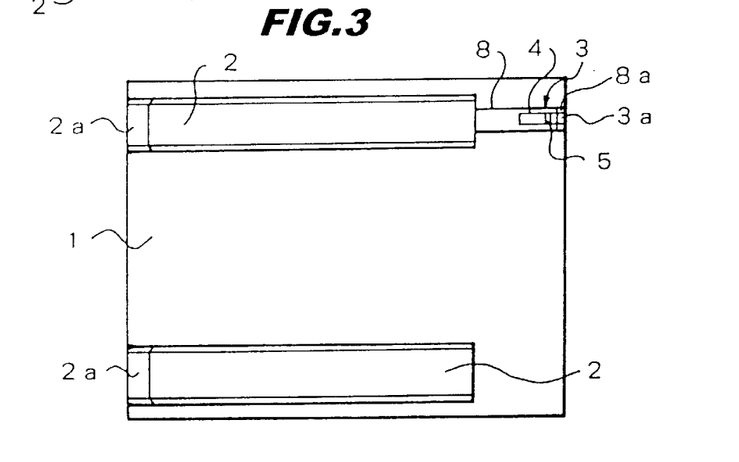
FIG. 3 is a plan view of the magnetic recording medium facing surface of the floating magnetic head of the invention.

A floating magnetic head according to an embodiment of the present invention will be hereinafter described with reference to FIGS. 1–3.

A composite magnetic head has two substantially straight floating rails 2 on a magnetic recording medium facing surface of a slider 1. The slider is made of a non-magnetic material. The two floating rails 2 extend parallel with each other along the magnetic head advancing direction relative to the magnetic recording medium (i.e., the longitudinal direction of the slider 1). An electromagnetic conversion element 3 has angled trailing edge 3a and is provided at a rear portion, in the advancing direction of the magnetic recording medium, of one of the floating rails 2. The electromagnetic conversion element 3 is constructed such that a coil (not shown) is wound on a magnetic core in which a magnetic gap 5 is formed between a pair of magnetic core pieces 4. The coil is connected to an external circuit of a hard disk apparatus main body. The electromagnetic conversion element 3 may be one that is formed by a thin-film process. The back surface of the slider 1, whose surface is opposite to the magnetic recording medium facing surface of the slider 1, is fixed by bonding to a spring member 7 extending from a holding member 6. Lift is exerted on the floating rails 2 due to air resistance that occurs when the floating rails 2 of the slider 1 and the magnetic recording medium make relative movement in a state that the magnetic gap 5 of the electromagnetic conversion element 3 is opposed to the magnetic recording medium. The lift causes the slider 1 to float above the magnetic recording medium with a very small spacing in between, in which state recording/reproducing action for writing/reading is effected between the electromagnetic conversion element 3 and the magnetic recording medium.

The two floating rails 2 provided on the slider 1 are cut out over the same length at their rear portions: the floating rails 2 of about 60 μm in height exist only on the front side of the cut-out portions. The front portion of each floating rail 2 is so shaped as to have a taper angle 2a of 0.5° to 1°, and both edges of each floating rail 2 extending in the longitudinal direction are chamfered. The above-mentioned cutting of the floating rails 2 is performed by mechanical working with a grinder, for instance.

The cut-out length of the floating rails 2 is set at 1/10 to 2/5 of the overall length of the slider 1 so that the flying height of the slider is stabilized. An auxiliary rail 8 extends rearward from the rear end of one of the floating rails 2. The auxiliary rail 8 has approximately the same height as the floating rails 2 while its width is 2/5 to 4/5 of the width of the latter. Since the electromagnetic conversion element 3 is buried in the auxiliary rail 8, the width of the auxiliary rail 8 may be set in a range from the track width (width of the magnetic core gap 5) of the electromagnetic conversion element 3 to 4/5 of the width of the floating rails 2. The electromagnetic conversion element 3 is provided at a rear portion of the auxiliary rail 8. The rear end of the electromagnetic conversion element 3 is approximately flush with the rear end of the slider 1. The rear end portions of the auxiliary rail 8 and the electromagnetic conversion element 3 are so shaped as to have a trailing edge angle 8a. The portion of the trailing edge angle 8a may be provided at a cut-out portion to prevent contact with the magnetic recording medium. Although in FIG. 3 the longitudinal center line of the floating rail 2 coincides with that of the auxiliary rail 8, they may be deviated from each other by shifting the auxiliary rail 8 laterally.

Figure 7:
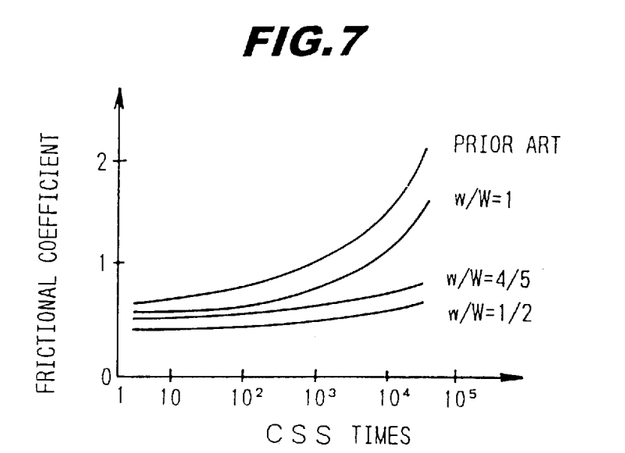
FIG. 7 is a graph showing a CSS characteristic of the floating magnetic head of the invention.

Flying height measurements on the floating magnetic head of this embodiment produced results that are approximately the same as those shown in FIGS. 6b and 6c (see SUMMARY OF THE INVENTION). Further, the flying height remained approximately constant with respect to a variation in the circumferential speed of the magnetic recording medium, whose characteristic is better than the corresponding characteristic of the conventional floating magnetic heads. CSS (contact start and stop) characteristic measurements on the magnetic head of this embodiment produced results shown in FIG. 7. For comparison, FIG. 7 also includes a result of a CCS characteristic measurement of a conventional floating magnetic head. As seen from FIG. 7, the friction coefficient of the floating magnetic head of this embodiment is smaller than that of the conventional floating magnetic head. In the embodiment, the friction coefficient increased only slightly with the increase of CSS times.

Next, floating magnetic heads according to second to seventh embodiments of the invention will be described with reference to FIGS. 4a–4f and 5a–5k.

As in the case of the first embodiment, each of floating magnetic heads of the second to seventh embodiments has two substantially straight floating rails 2 on a magnetic recording medium facing surface of a slider 1. The slider is made of a non-magnetic material. The two floating rails 2 extend parallel with each other along the magnetic head advancing direction relative to the magnetic recording medium. An electromagnetic conversion element 3 is provided at a rear portion of one of the floating rails 2 in the advancing direction of the magnetic recording medium. A writing or reading operation is performed in a state that a magnetic gap 5 of an electromagnetic conversion element 3 is opposed to the magnetic recording medium. A rear portion of the floating rail 2 where the electromagnetic conversion element 3 is provided is constructed such that the lateral portions of the floating rail 2 are removed by grinding, so as to form rearward inclined surfaces 11 or stepped surfaces 12 that are parallel with the magnetic recording medium facing surface.

Figure 4A:
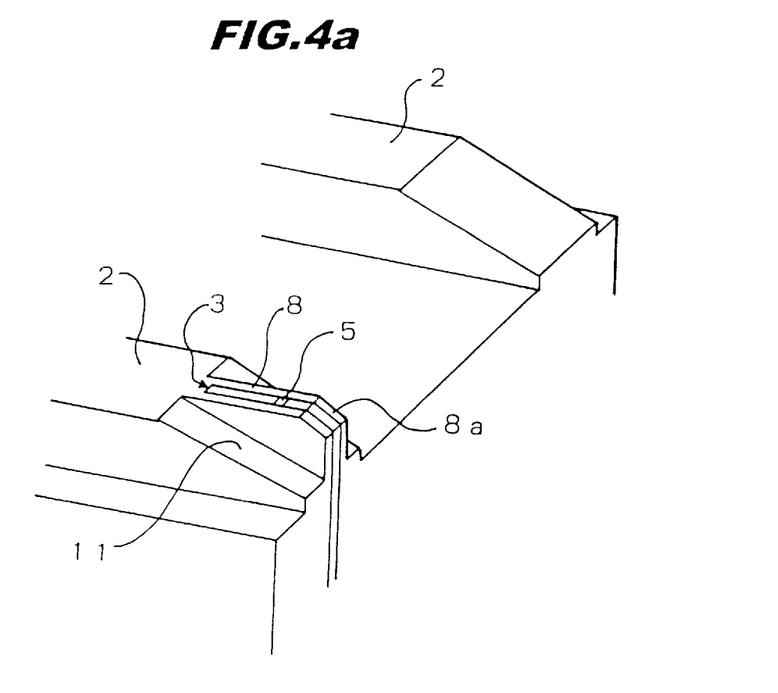
Figure 4B:
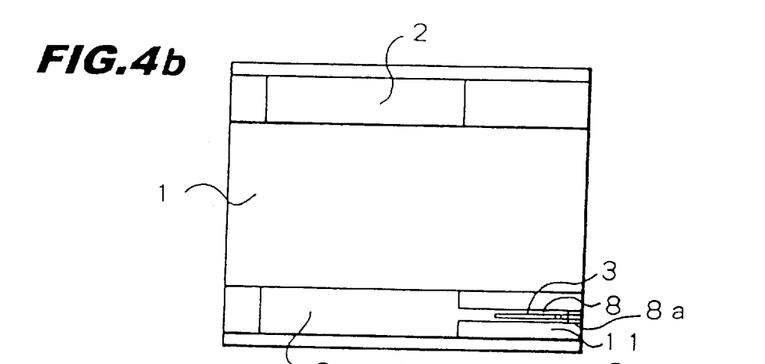
FIG. 4b is a plan view, and FIG. 4c a side view of a floating magnetic head according to a second embodiment of the invention.
Figure 4C:
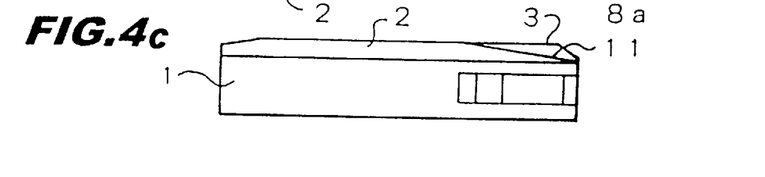
Figure 4D:
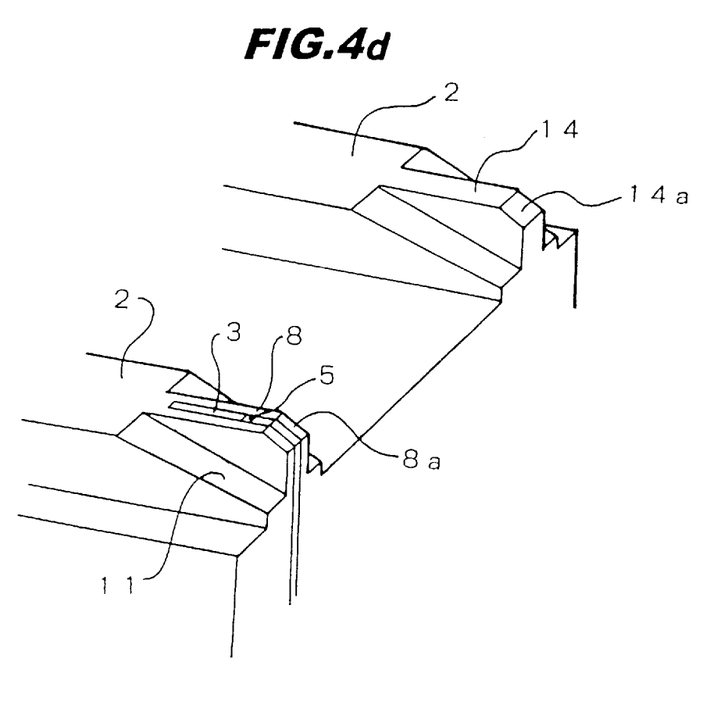
Figure 4E:
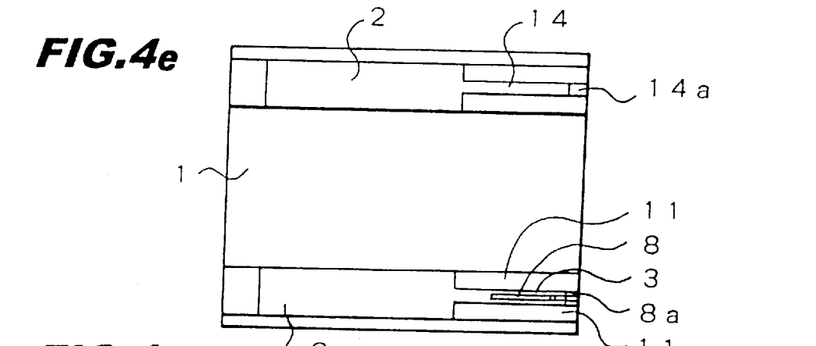
Figure 4F:
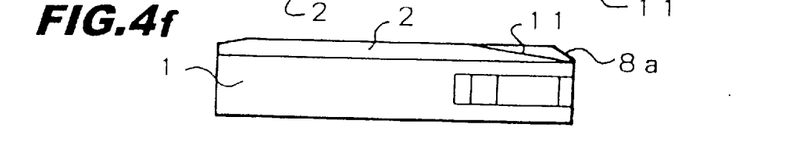
FIG. 4f is a side view of a floating magnetic head according to a modification.

For example, in the embodiments of FIGS. 4a–4c and 4d–4f, portions of the floating rail 2 on both sides of the electromagnetic conversion element 3 are removed by grinding except for portions adjacent to the electromagnetic conversion element 3, to be formed on inclined surfaces 11 of an inclination angle 5° to 20°. The residual floating rail portions adjacent to the electromagnetic conversion element 3 constitute an auxiliary rail 8. Rear end portions of the auxiliary rail 8 and the electromagnetic conversion element 3 on the side of the magnetic recording medium facing surface are so shaped as to have a trailing edge angle 8a. In the embodiment of FIGS. 4a–4c, an end portion of the floating rail 2 that is not provided with the electromagnetic conversion element 3 is removed in the above manner. In the embodiment of FIGS. 4d–4f, a second auxiliary rail 14 is formed which has approximately the same width and height as the auxiliary rail 8 of the electromagnetic conversion element 3. An end portion of the second auxiliary rail 14 is so shaped as to have a trailing edge angle 14a. While in these embodiments the longitudinal center lines of the auxiliary rail 8 and the floating rail 2 coincide with each other, they may be deviated from each other by shifting the auxiliary rail 8 as in the embodiments of FIGS. 5a and 5b, or the inclined surface 11 may be formed on only one side when occasion demands.

Figure 5A:
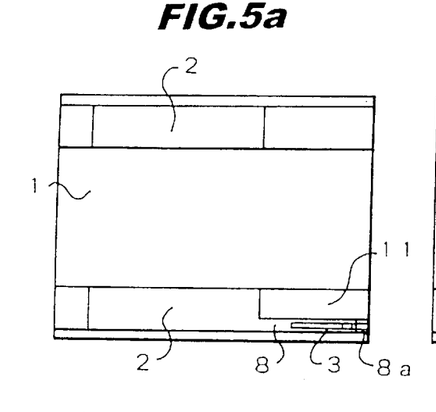
FIG. 5a is a plan view of a floating magnetic head according to a third embodiment of the invention.
Figure 5B:
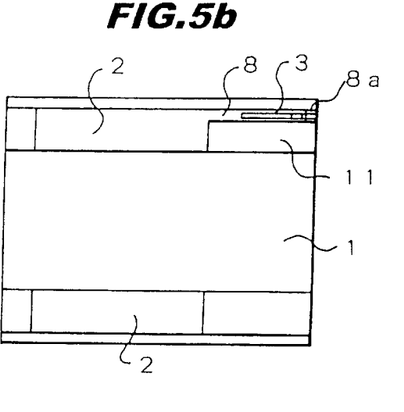
FIG. 5b is a plan view of a floating magnetic head according to a fourth embodiment of the invention.
Figure 5C:
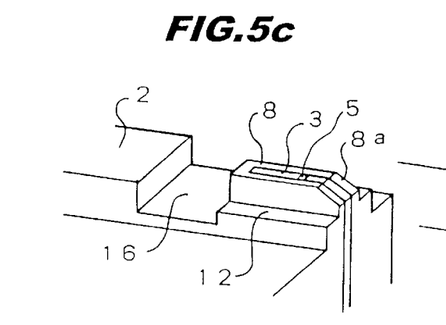
Figure 5D:
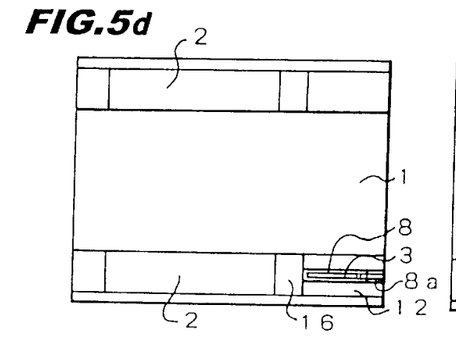
Figure 5E:
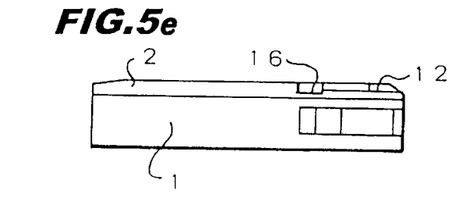
FIG. 5e is a side view of a floating magnetic head according to a fifth embodiment of the invention.

In the embodiment of FIGS. 5c–5e, both sides of the electromagnetic conversion element 3 are removed by grinding except for portions adjacent to the electromagneticconversion element 3, to form stepped surfaces 12 that are parallel with the magnetic recording mediumfacing surface. The residual portions adjacent to the electromagnetic conversion element 3 constitute an auxiliary rail 8. Further, a portion in front of the electromagnetic conversion element 3 is removed by grinding to form a transverse groove 16, whereby the floating rail 2 and the portion of the electromagnetic conversion element 3 are separated from each other. A rear portion of the auxiliary rail 8 is so shaped as to have a trailing edge angle 8a.

Figure 5F:
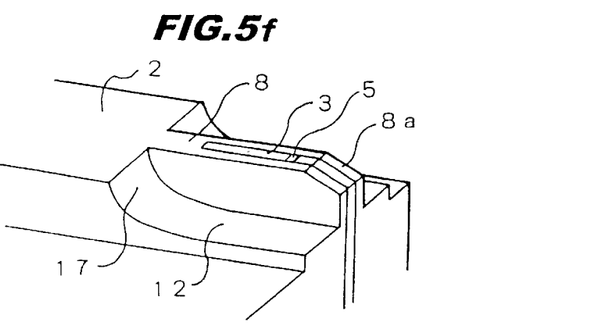
Figure 5G:
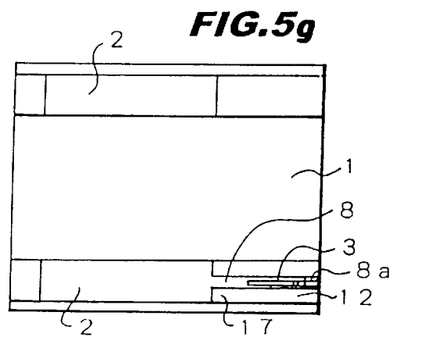
Figure 5H:
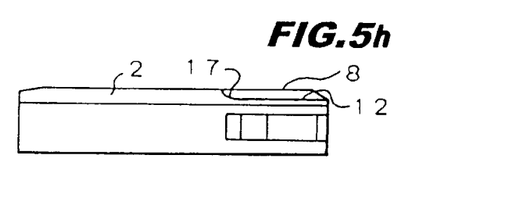
FIG. 5h is a side view of a floating magnetic head according to a sixth embodiment of the invention.

In the embodiment of FIGS. 5f–5h, both sides of the electromagnetic conversion element 3 are removed by grinding except for portions adjacent to the electro magnetic conversion element 3, to form stepped surfaces 12 that are parallel with the magnetic recording medium facing surface. Portions in front of the stepped surfaces 12 are shaped into inclined, curved surfaces 17. The residual portions adjacent to the electromagnetic conversion element 3 constitute an auxiliary rail 8. Further, the auxiliary rail 8 in which the electromagnetic conversion element 3 is buried is continuous with the rear end of the floating rail 2. A rear portion of the auxiliary rail 8 is so shaped as to have a trailing edge angle 8a.

Figure 5I:
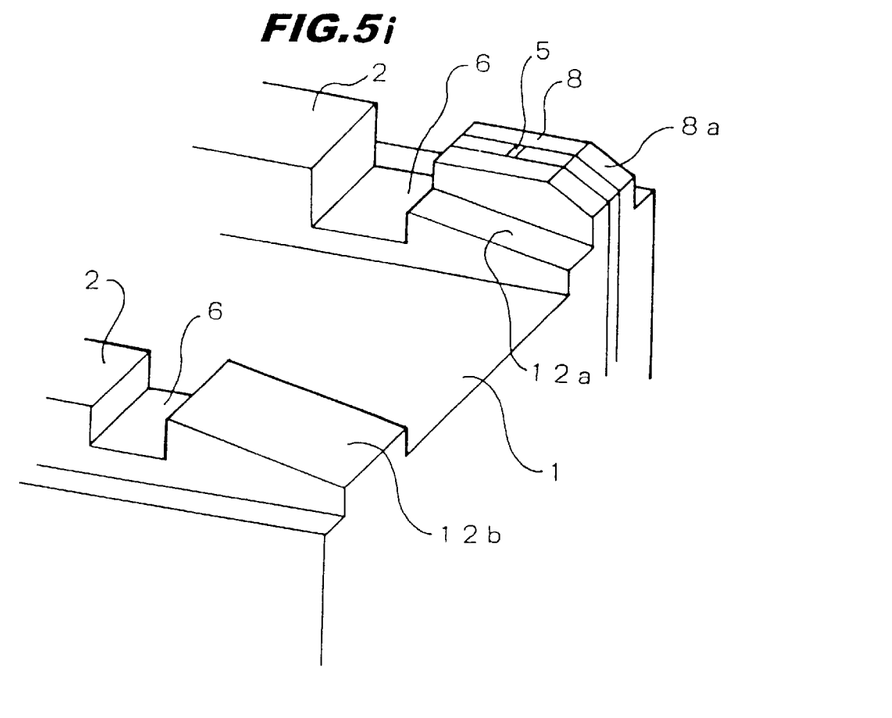
Figure 5J:
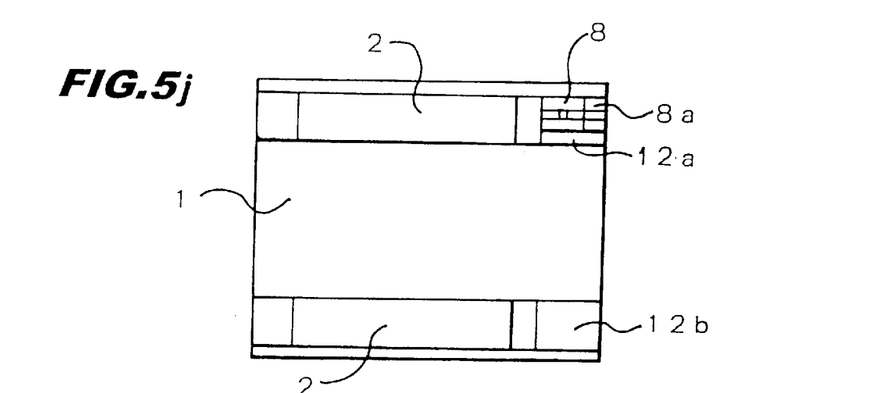
Figure 5K:
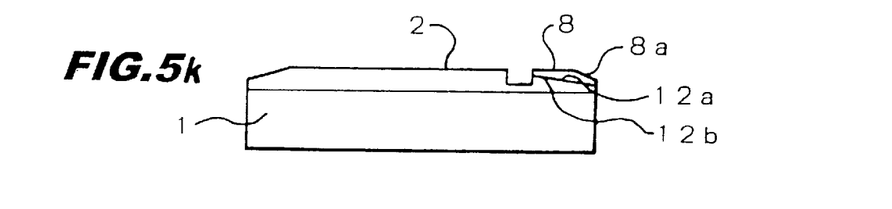
FIG. 5k is a side view of a floating magnetic head according to a seventh embodiment of the invention.

In the embodiment of FIGS. 5i–5k, as in the case of the embodiment of FIGS. 5c–5e, a groove 16 is formed between the floating rail 2 and the auxiliary rail 8. Stepped surfaces 12a on both sides of the electromagnetic conversion element 3 are formed on the inclined surfaces that are gentler than the trailing edge angle 8a. On the side where the electromagnetic conversion element 3 is not provided, a groove 16 and a wide inclined surface 12b are formed in the rear of the floating rail 2.

As described above, the several embodiments shown in FIGS. 4a–4f and 5a–5k are possible. In addition, it is also possible to apply part of a certain embodiment to another embodiment with alteration of the latter.

Next, a production method of the floating magnetic head of FIG. 1 will be described with reference to FIG. 8.

Two floating rails 2 are formed on the magnetic recording medium facing surface of a slider 1 along the longitudinal direction of the slider 1 over its entire longitudinal length, and front portions of the respective floating rails 2 are so shaped as to have a taper angle 2a. Then, a groove 21 is formed at a rear portion, in the advancing direction of the magnetic recording medium, of one of the floating rails 2, and an electromagnetic conversion element 3 is inserted into the groove 21 and fixed thereto by using a glass material. Alternatively, the step of fixing the electromagnetic conversion element 3 to the groove 21 may be performed after removal of rear portions of the floating rails 2 (described below).

Figure 8:
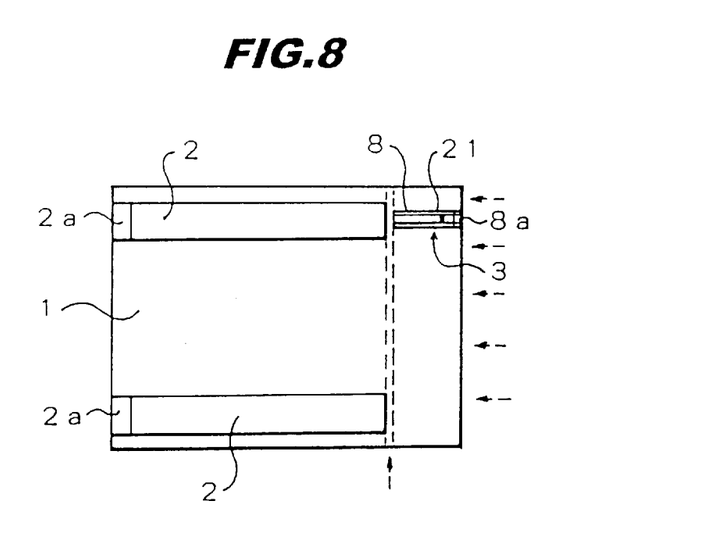
FIG. 8 illustrates a method of cutting rear portions of the floating rails of the floating magnetic head.

Thereafter, mechanical working with a grinder, for instance, is performed in the direction indicated by arrows in FIG. 8 to remove an rear portion of one of the floating rails 2 to thereby form a narrower auxiliary rail 8, as well as to similarly work a rear portion of the other floating rail 2. The width of the auxiliary rail 8 is set in a range from the track width of the electromagnetic conversion element 3 to ⅘ of the width of the floating rail 2. Then, rear portions of auxiliary rail 8 and the electromagnetic conversion element 3 on the side of the magnetic recording medium facing surface are so shaped as to have a trailing edge angle 8a. In some cases, a separating groove (indicated by dashed lines in FIG. 8) is formed between the auxiliary rail 8 and the floating rail 2 in the above mechanical working. The separating groove does not have large influence on the floating characteristics.

The auxiliary rail 8 may be worked in a state that the electromagnetic conversion element 3 has not been fixed to the groove 21 of the slider 1. That is, the electromagnetic conversion element 3 may be fixed to the groove 21 after the rear portions of the floating rails 2 are subjected to the mechanical working with a grinder, for instance.

In the floating magnetic head according to the invention, since the rear portions of the floating rails of the slider are cut out, lift occurs only at the front portion where the floating rails exist. There does not occur lift as would otherwise be likely to occur at the rear portion in the advancing direction of the slider due to strong air resistance. Therefore, the slider is allowed to float stably above the magnetic recording medium at a very small height. Further, the flying height of the slider becomes stable with respect to a variation of the speed that depend on the radial position on the magnetic recording medium. As a result, the slider and the magnetic recording medium are prevented from contacting with each other and thereby being damaged. Further, the CSS characteristic can be improved.

As for the producing method of the floating magnetic head, since part of each floating rail is removed by mechanical working with a grinder, for instance, the floating magnetic head can be produced economically by using a simple apparatus.

We claim:

1. A floating magnetic head for writing or reading data to a magnetic recording medium, comprising:

a slider having a length, a first surface facing the magnetic recording medium, a leading edge, and a trailing edge;

first and second floating rails provided on the first surface, said first floating rail having a width and a height;

an auxiliary rail provided on the first surface and having a height, a length and a width, being aligned with the first floating rail and being positioned at the trailing edge of the slider, the auxiliary rail width being ⅖ to ⅘ the width of the first floating rail, and the auxiliary rail length being ⅒ to ⅔ the length of the slider, and the auxiliary rail and the first floating rail having heights approximately the same above the first surface; and an electromagnetic conversion element having a magnetic gap, provided in the auxiliary rail at the trailing edge; wherein the magnetic gap opposes the magnetic recording medium to effect writing or reading, and wherein the auxiliary rail and the electromagnetic conversion element have a trailing edge angle to prevent them from contacting the magnetic recording medium.

2. A floating magnetic head according to claim 1, further comprising a back extension extending back and down from the first floating rail toward the trailing edge of the slider, the back extension forming a sloped surface on at least one side of the auxiliary rail.

3. A floating magnetic head according to claim 1, wherein the first and second floating rails respectively have trailing ends toward the trailing edge of the slider, the trailing ends being at an angle of 5° to 20° with respect to the first surface of the slider.

4. A floating magnetic head according to claim 1, wherein the first and second floating rails respectively have leading edges toward the leading edge of the slider, the leading edges of the rails being tapered at an angle with respect to the first surface of the slider.

5. A floating magnetic head according to claim 1, further comprising a back extension extending back from the first floating rail toward the trailing edge of the slider, the back extension forming a stepped surface on at least one side of the auxiliary rail, the stepped surface having a height above and being generally parallel with the first surface of the slider, the auxiliary rail height being greater than the height of the stepped surface.

6. A floating magnetic head according to claim 1, further comprising a back extension extending back from the first floating rail toward the trailing edge of the slider, the beck extension forming a stepped surface on at least one side of the auxiliary rail, the stepped surface having a height above and generally parallel with the surface of the slider, the auxiliary rail height being greater than the height of the stepped surface, and the back extension having a curved surface portion extending continuously from the stepped surface, up to the first floating rail.

7. A floating magnetic head according to claim 1, wherein the auxiliary rail and the first floating rail respectively have longitudinal center lines, the center lines of the floating rail and auxiliary rail being offset such that the auxiliary rail is not centered with the floating rail.

8. A floating magnetic head according to claim 1, wherein a groove is provided between the first floating rail and the auxiliary rail.

9. A floating magnetic head according to claim 1, wherein the second floating rail has a height above the first surface and the height of the first and second rails is 50 $\mu$m to 100 $\mu$m.

10. A floating magnetic head according to claim 1, wherein the auxiliary rail is continuous with the first floating rail and formed by grinding away a rear extension of the first floating rail, toward the trailing edge of the slider.

* * * * *

UNITED STATES PATENT AND TRADEMARK OFFICE
CERTIFICATE OF CORRECTION

PATENT NO. : 5,771,133
DATED : June 23, 1998
INVENTOR(S) : Ryo Goto, et al.

It is certified that error appears in the above-identified patent and that said Letters Patent is hereby corrected as shown below:

Col. 1, line 37, change "medium To" to --medium. To--.

Col. 3, line 5, change "l/L" to --$\ell$ / L-- and; change "l" to --$\ell$--;
line 20, change "l/L" to --$\ell$ / L--.
line 67, change "pressure ," to --pressure,--.

Col. 4, line 45, change "includes" to --is--;
line 46, after "4c" insert --is--;
line 48, after "4e" insert --is--;
line 58, after "view" (first occurrence) insert --Fig. 5g is--.

Col. 5, line 25, after "has" insert --an--.

Col. 6, line 41, change "medium ." to --medium.--

Col. 7, lines 13 and 14, change "electromagneticcon-version" to --electromagnetic conversion--.

Col. 9, line 21, change "beck" to --back--.

Signed and Sealed this

Twenty-ninth Day of December, 1998

Attest:

BRUCE LEHMAN

*Attesting Officer*   *Commissioner of Patents and Trademarks*